(12) United States Patent
Lyman

(10) Patent No.: US 9,068,681 B1
(45) Date of Patent: Jun. 30, 2015

(54) PIPE HAVING AN EMBEDDED DETECTABLE ELEMENT

(71) Applicant: Paul S. Lyman, Virginia Beach, VA (US)

(72) Inventor: Paul S. Lyman, Virginia Beach, VA (US)

(*) Notice: Subject to any disclaimer, the term of this patent is extended or adjusted under 35 U.S.C. 154(b) by 89 days.

(21) Appl. No.: 13/733,015

(22) Filed: Jan. 2, 2013

(51) Int. Cl.
*F16L 55/00* (2006.01)
*B32B 27/00* (2006.01)
*F16L 11/12* (2006.01)

(52) U.S. Cl.
CPC .................. *F16L 55/00* (2013.01); *B32B 27/00* (2013.01); *F16L 11/12* (2013.01)

(58) Field of Classification Search
USPC .................. 138/104, 174; 285/9.1, 133.11, 93
See application file for complete search history.

(56) References Cited

U.S. PATENT DOCUMENTS

| | | | | | |
|---|---|---|---|---|---|
| 4,449,098 | A | * | 5/1984 | Nakamura et al. | 324/326 |
| 5,017,873 | A | * | 5/1991 | Rippingale et al. | 324/326 |
| 5,036,210 | A | * | 7/1991 | Goodman | 235/493 |
| 5,127,441 | A | * | 7/1992 | Rains | 138/114 |
| 5,228,478 | A | * | 7/1993 | Kleisle | 138/104 |
| 5,476,562 | A | * | 12/1995 | Inhofe, Jr. | 156/156 |
| 5,573,039 | A | * | 11/1996 | Mang | 138/141 |
| 5,817,926 | A | * | 10/1998 | Brandes | 73/40.5 R |
| 6,305,427 | B1 | * | 10/2001 | Priest, II | 138/125 |
| 6,337,115 | B1 | * | 1/2002 | McMahon | 428/36.9 |
| 7,413,021 | B2 | * | 8/2008 | Madhavan et al. | 166/380 |
| 8,066,033 | B2 | * | 11/2011 | Quigley et al. | 138/125 |
| 2002/0193004 | A1 | * | 12/2002 | Boyle et al. | 439/577 |
| 2006/0081301 | A1 | * | 4/2006 | Wilkinson | 138/104 |
| 2011/0005802 | A1 | * | 1/2011 | Morrow | 174/96 |

* cited by examiner

*Primary Examiner* — Paul R Durand
*Assistant Examiner* — Vishal Pancholi
(74) *Attorney, Agent, or Firm* — Shaddock Law Group, PC

(57) ABSTRACT

A detectable/traceable pipe that includes a pipe body defining a hollow and a detectable element embedded or encased within the pipe body so as to provide a detectable property to the pipe body. The pipe body may be constructed of a non-ferrous material and the detectable element is co-extruded with the pipe body.

20 Claims, 4 Drawing Sheets

PIPE HAVING AN EMBEDDED DETECTABLE ELEMENT

CROSS-REFERENCE TO RELATED APPLICATIONS

None.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE INVENTION

1. Field of the Invention

The present disclosure relates generally to the field of pipes and tubing. More specifically, the present invention relates to pipes and tubing that include an embedded element/traceable element.

2. Description of Related Art

The pipes that are used in today's water and sewer mains are either polyvinyl chloride (commonly abbreviated PVC) or ductile iron. Once ductile iron is installed underground, it can be traced from the surface. There are two drawbacks with ductile iron. One, that it is difficult to obtain and two, it is more expensive than PVC pipe. These two reasons make it not the ideal pipe to be used in today's water and sewer mains. The majority of pipes that are used in today's water and sewer mains are made of PVC.

The PVC pipe that is installed in today's water and sewer mains by itself is non-detectable. Once the PVC pipe is installed and covered with dirt or concrete there is no way of locating the newly installed utility, which creates a realm of problems.

PVC piping is inexpensive but has the drawback that once installed there is no way that it can be traced from the surface. It is very important that installed pipe can be traced from the surface in case more work needs to be done in that location in the future and accurate as-built drawings are necessary. As-built drawings are vital to the municipalities since they serve to document where pipe has been installed.

Once pipe is laid it is traced from the surface using a metal detector. Presently, the current methods used to make these PVC pipes detectable from the surface are either to use duct tape to attach a detectable element to the outside of the pipe after it is installed or to place this detectable element in the ground, above the pipe.

BRIEF SUMMARY OF THE INVENTION

Unfortunately, there are many drawbacks to the current pipe and detection methods. Currently affixed of buried wires can be shifted or broken either while being installed or when they are covered with dirt. These wires can also be shifted, damaged, or broken at a later date by other contractors working in the same area.

According to the present invention, a detectable element is embedded within the pipe or tube, so that the pipe or tube can be detected from the surface, once implanted underground. According to various exemplary embodiments of the present invention, the detectable element comprises a detectable, metal wire that is embedded within the pipe at the time of manufacture.

By embedding the detectable element within the pipe, the possibility of the detectable element being shifted or broken is reduced or eliminated. This ultimately saves time because once the pipe is installed, additional wire does not have to be attached with duct tape or run above the pipe.

According to certain nonlimiting aspects of the present invention, the embedded detectable element can also be embedded in fittings, 1-fittings, T-joints, spigots, and other types of pipe fittings. Also, the pipe having the embedded detectable element eliminates the need for construction companies to store metal wire, thus eliminating the possibility of theft.

When the detectable element is embedded in the pipe during manufacture, steps can be taken to assure the detectable element cannot be removed once the manufacturing process is complete. This is to eliminate the possibility of theft, especially of copper or other valuable materials used to make the detectable element.

The pipe of the present invention is laid or implanted the same way as the current pipes. It is best to position the pipe with the detectable element to the top of the pipe, but this is not necessary. If the worker lays a piece of pipe and the detectable element is not precisely to the top, it can still be detected from the surface.

According to certain aspects of the present invention, all connecting pipe fittings will also be embedded with a detectable element so that pipes and joints can be detected and any break can be detected and discovered. Pipe having the embedded detectable element allows a metal detector to follow above the ground and trace where the pipe is connected and where it is not connected. This would be a great benefit because when the metal detector stops sensing the detectable element that means there is a break in the pipe.

In certain embodiments, the mark, SureTracer™ or some other identifying mark or information is stamped on the outside of the pipe, over the enclosed detectable element so that the element will be easily identified as a detectable/traceable pipe and will allow the installer to know which side should be up (again, not necessary, but preferred).

In various exemplary, non-limiting embodiments, the detectable/traceable pipe comprises an elongate portion of material extending from a first end to a second end and defining a pipe body having a hollow. A detectable element is embedded or encased within the pipe body so as to provide a detectable property to the pipe body. The detectable element may be embedded just below an outer surface of the pipe body or may be embedded towards the upper portion of the pipe body.

In certain exemplary embodiments, the detectable element is embedded parallel to the longitudinal axis of the pipe body. Alternatively, the detectable element may be embedded at any angle relative to the longitudinal axis of the pipe body.

Exemplary connection fittings or T-fittings are also provided. The T-fittings have a first elongate portion of material extending from a first end to a second end and defining a first pipe body having a hollow and a second elongate portion of material extending from the pipe body to a terminating end and defining a second pipe body having a hollow. The second pipe body has a longitudinal axis that is substantially perpendicular to a longitudinal axis of the first pipe body. A first detectable element is embedded or encased within the first pipe body and a second detectable element is embedded or encased within the second pipe body such that the first detectable element provides a magnetically detectable property to the first pipe body and the second detectable element provides a magnetically detectable property to the second pipe body.

The present invention also contemplates connection fittings embedded with a detectable element.

Accordingly, the presently disclosed invention provides detectable/traceable pipe with a detectable element that is detectable with a metal or other detector to allow the pipe to be easily traced once the pipe is implanted in the ground.

The presently disclosed invention separately provides detectable/traceable pipe that ensures that the embedded detectable element cannot be removed once it is embedded in the pipe.

The presently disclosed invention separately provides detectable/traceable pipe that allows for better detection of the pipe.

The presently disclosed invention separately provides detectable/traceable pipe that allows for better detection of any breaks in the pipe.

The presently disclosed invention separately provides detectable/traceable pipe that saves money, time, space, and reduces the possibility of theft.

These and other features and advantages of the presently disclosed detectable/traceable pipe are described in or are apparent from the following detailed description of the exemplary, non-limiting embodiments.

BRIEF DESCRIPTION OF THE SEVERAL VIEWS OF THE DRAWINGS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to employ the present invention.

The exemplary embodiments of this invention will be described in detail, with reference to the following figures, wherein like reference numerals refer to like parts throughout the several views, and wherein.

DETAILED DESCRIPTION OF THE INVENTION

For simplicity and clarification, the design factors and operating principles of the detectable/traceable pipe according to this invention are explained with reference to various exemplary embodiments of detectable/traceable pipe according to this invention. The basic explanation of the design factors and operating principles of the detectable/traceable pipe is applicable for the understanding, design, and operation of the detectable/traceable pipe of this invention. It should be appreciated that the detectable/traceable pipe can be adapted to many applications where a pipe or tube is installed, embedded, or implanted so that it is not immediately visible.

It should also be appreciated that the terms "pipe", "tube", "PVC", and "detectable/traceable pipe" are used for basic explanation and understanding of the operation of the systems, methods, and apparatuses of this invention. Therefore, the terms "pipe", "tube", "PVC", and "detectable/traceable pipe" are not to be construed as limiting the systems, methods, and apparatuses of this invention. Thus, the terms "pipe" and "tube" are to be understood to broadly include any structures or devices within which a detectable element can be embedded.

For simplicity and clarification, the detectable/traceable pipe of this invention will be described as being connected to other portions of detectable/traceable pipe and buried underground. However, it should be appreciated that these are merely exemplary embodiments of the detectable/traceable pipe and are not to be construed as limiting this invention. Thus, the features and elements of the detectable/traceable pipe of this invention may be utilized in any application in which a pipe, tube, or other element is installed, embedded, or implanted so that it is not immediately visible.

Throughout this application the word "comprise", or variations such as "comprises" or "comprising" are used. It will be understood that these terms are meant to imply the inclusion of a stated element, integer, step, or group of elements, integers, or steps, but not the exclusion of any other element, integer, step, or group of elements, integers, or steps.

Figure 1:
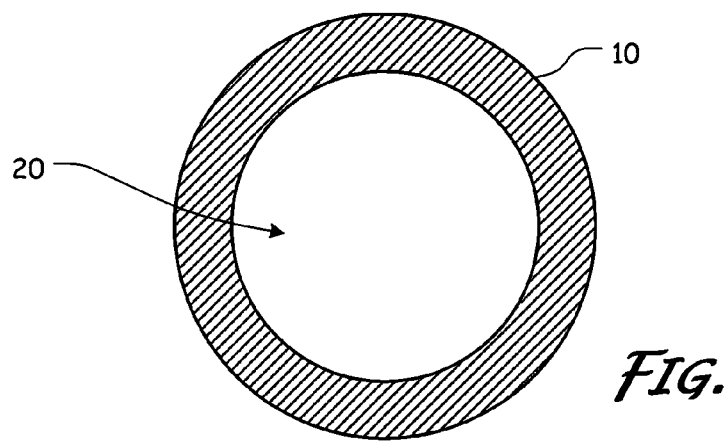
FIG. 1 illustrates a cross-sectional view of a known pipe without the embedded detectable element of the present invention.

Turning now to the drawing FIGS., FIG. 1 illustrates a cross-sectional view of a known pipe without the embedded detectable element of the present invention. As shown in FIG. 1, the known pipe includes a circular body 10 that defines an interior hollow 20. As the pipe is extended, a partial or continuous cylinder or tube is formed.

Figure 2:
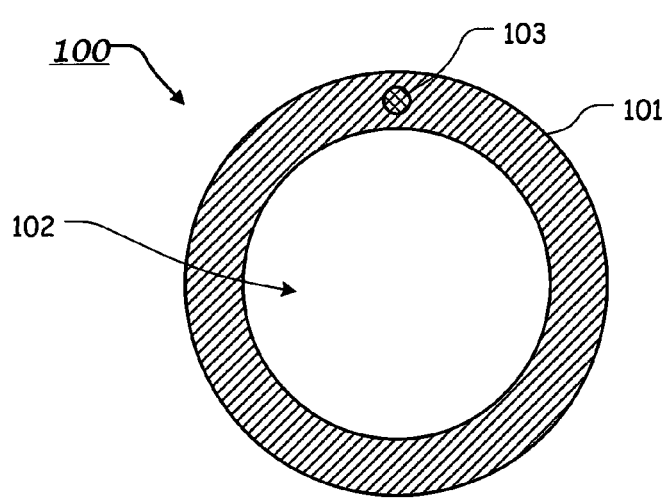
FIG. 2 illustrates a cross-sectional view of a pipe with the embedded detectable element according to the present invention.
Figure 3:
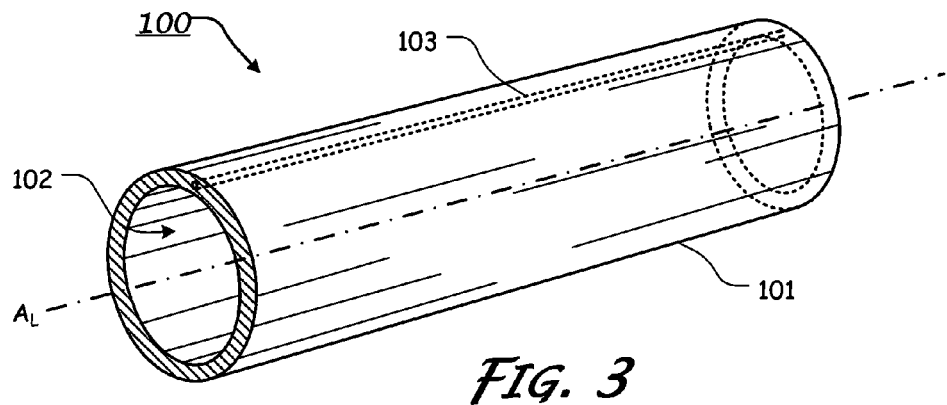
FIG. 3 illustrates a perspective view of a pipe with the embedded detectable element according to the present invention.

FIGS. 2 and 3 illustrate certain elements and/or aspects of a first exemplary embodiment of the detectable/traceable pipe 100, according to this invention. In an illustrative, non-limiting embodiment of this invention, as illustrated in FIGS. 2 and 3, the detectable/traceable pipe 100 comprise at least some of a pipe body 101 defining a hollow 102 and a detectable element 103.

In various exemplary embodiments, the pipe body 101 is constructed of polyvinyl chloride (PVC). In still other exemplary embodiments, the pipe body 101 may be formed of stainless steel, aluminum, titanium, and/or other non-ferrous metals, as well as various alloys and composites thereof, glass-hardened polymers, polymeric composites, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the pipe body 101 of the detectable/traceable pipe 100 is a design choice based on the desired strength and/or functionality of the detectable/traceable pipe 100.

It should also be understood that the overall size and shape of the detectable/traceable pipe 100 is a design choice based upon the desired strength and/or functionality of the detectable/traceable pipe 100.

In certain exemplary embodiments, the detectable element 103 comprises copper. Alternatively, the detectable element 103 may comprise any ferrous material having a sufficient iron content such that the material is magnetic and/or otherwise detectable by a metal detector or other appropriate device. In still other embodiments, the detectable element 103 may comprise a low or non-ferrous material impregnated with a ferrous material.

In certain exemplary, non-limiting embodiments, the detectable element 103 is in the form of a wire that is co-extruded with the pipe body 101. By co-extruding the pipe body 101 and the detectable element 103, it is difficult or impossible to remove the detectable element 103 from the pipe body 101.

Alternatively, the detectable element 103 may be deposited in a particular region of the pipe body 101 during construction of the pipe body 101.

Thus, the detectable/traceable pipe 100 comprises an elongate portion of material extending from a first end to a second end and defining a pipe body 101 having a hollow 102. A detectable element 103 is embedded or encased within the pipe body 101 so as to provide a detectable property to the pipe body 101. The detectable property may be a magnetically detectable property that is provided to the pipe body 101. The detectable element 103 may be embedded just below an outer surface of the pipe body 101 or may be embedded towards the upper portion of the pipe body 101.

It should be appreciated that while the detectable element 103 is shown as being embedded parallel to the longitudinal axis $A_L$ of the pipe body 101, the detectable element 103 may be embedded at any angle relative to the longitudinal axis $A_L$ of the pipe body 101.

By having the detectable element 103 formed of a continuous portion of material, a break in the pipe body 101 will result in a break of the detectable element 103. In this manner, breaks in the pipe body 101 can be detected without visual inspection of the pipe body 101.

Figure 4:
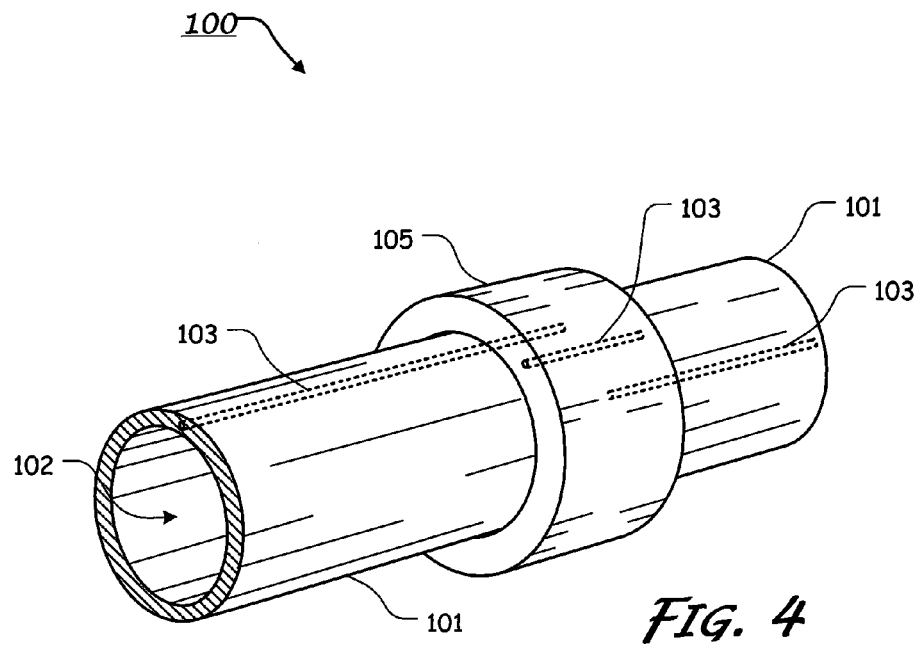
FIG. 4 illustrates a perspective view of two pipes connected with a fitting, each embedded with a detectable element according to the present invention.
Figure 5:
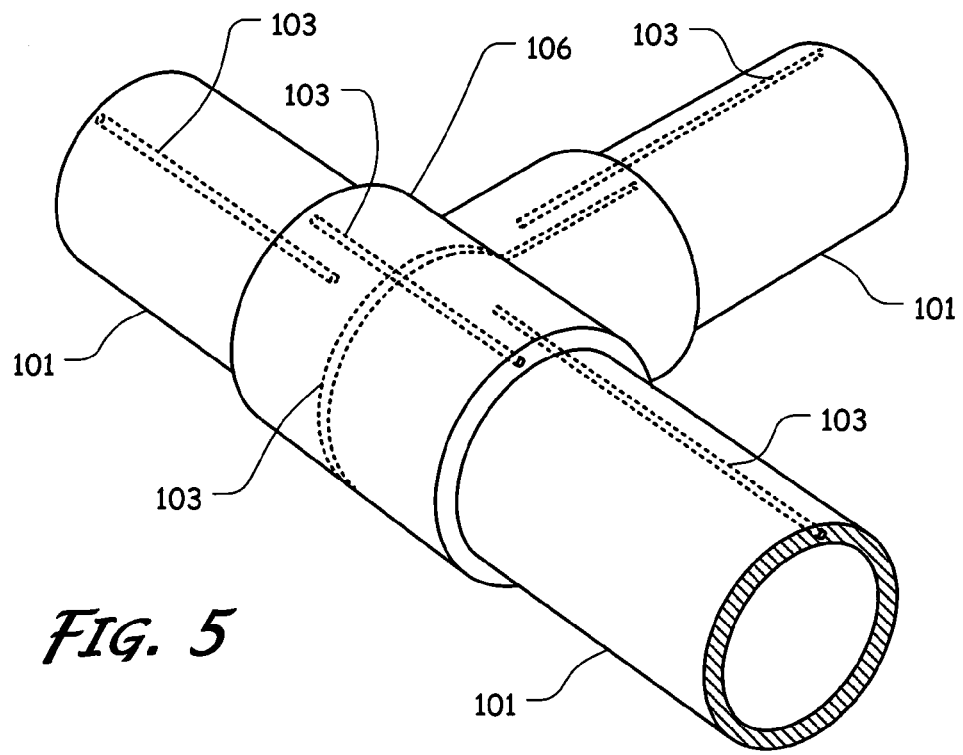
FIG. 5 illustrates a perspective view of three pipes connected with a T-joint, all embedded with the detectable element according to the present invention.

FIGS. 4 and 5 illustrate a detectable element 103 being embedded within an exemplary connection fitting 105 or an exemplary T-fitting 106. As shown, the connection fitting 105 and the T-fitting 106 each include a continuous portion of a detectable element 103 embedded or encased within the body of the connection fitting 105 and the T-fitting 106.

The continuous portions of the detectable element 103 are embedded along an entire length of the fittings, so as to overlap at least a portion of any pipe body 101 inserted within the fittings. In this manner, when portions of pipe body 101 are connected using the connection fitting 105 or the T-fitting 106, little or no break in the detectable element 103 would be detected.

As illustrated in FIGS. 4 and 5, various portions of pipe body 101 may be fitted together such that the detectable elements 103 are not aligned with one another. For example, the detectable element 103 of one pipe body 101 may be positioned towards an upper portion of the pipe body 101 at a relative 12 o'clock position, while another detectable element 103 of another pipe body 101 may be aligned at a relative 2 o'clock position, towards the side of the pipe body 101. Thus, it should be appreciated that it is not imperative that the detectable elements 103 of various components be precisely aligned when portions of pipe body 101 are coupled or installed. The detectable elements 103 can be positioned so as to be aligned with one another or off-center for one another. The detectable element can be detected from the surface even if it is not laid in a straight line, facing the surface.

Figure 6:
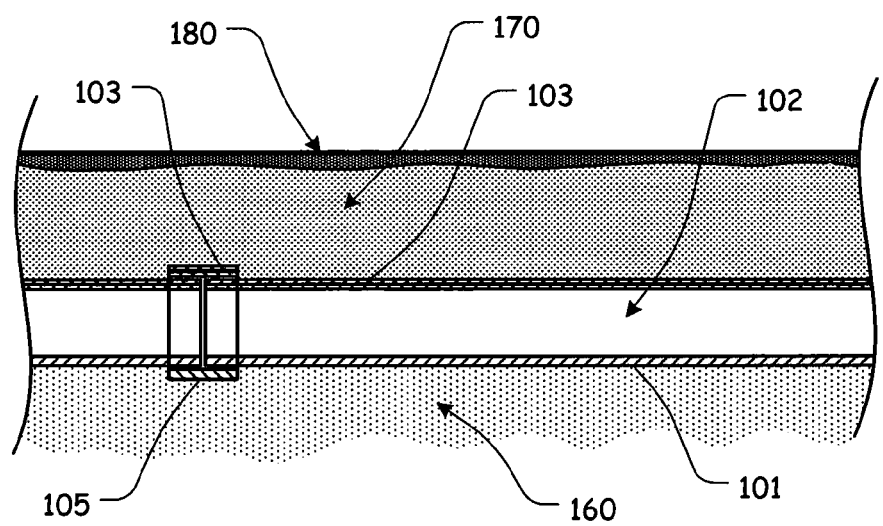
FIG. 6 illustrates a cross-section of two pipes connected with a fitting, laid underground, all embedded with the detectable element of the present invention.
Figure 7:
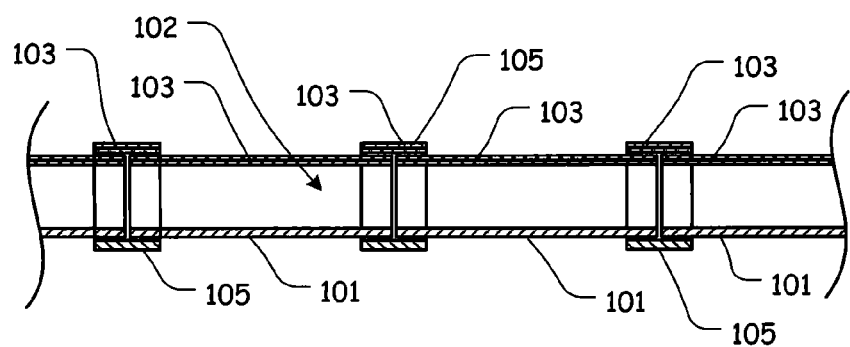
FIG. 7 illustrates a perspective view of several pipes connected with fittings, each embedded with a detectable element according to the present invention.

FIGS. 6 and 7 illustrate cross-sectional views of two or more pipe bodies 101 connected with a fitting 105. As illustrated in FIG. 6, the coupled or connected pipe bodies 101 can be laid underground, atop a betting of, for example, dirt and stone 160. Material, such as, for example, backfill 170 and asphalt 180 may be placed atop the connected pipe bodies 101 and the detectable elements 103 can still be detected and traced.

Figure 8:
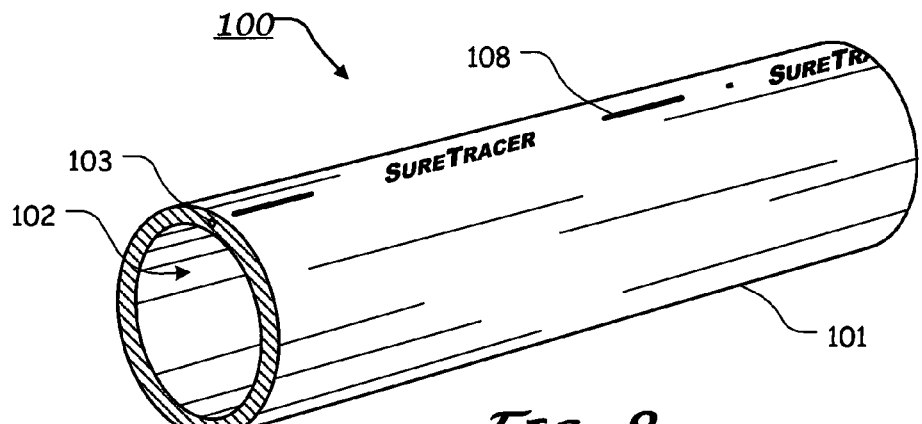
FIG. 8 illustrates a perspective view of a pipe with the embedded detectable element according to the present invention showing an indication stamp showing the approximate location of the detectable element and indicating that the pipe is a SureTracer™ pipe.

FIG. 8 illustrates a perspective view of a pipe body 101 with an embedded detectable element 103, according to the present invention. As shown in FIG. 8, the exterior surface of the pipe body 101 includes an indication stamp 108 showing the approximate location of the detectable element 103. In certain exemplary embodiments, the indication stamp 108 may also include identifying indicia, such as, for example the mark SureTracer™, indicating that the pipe includes a detectable element 103.

While this invention has been described in conjunction with the exemplary embodiments outlined above, the foregoing description of exemplary embodiments of the invention, as set forth above, are intended to be illustrative, not limiting and the fundamental invention should not be considered to be necessarily so constrained. It is evident that the invention is not limited to the particular variation set forth and many alternatives, adaptations modifications, and/or variations will be apparent to those skilled in the art.

It is to be understood that the phraseology of terminology employed herein is for the purpose of description and not of limitation. Unless defined otherwise, all technical and scientific terms used herein have the same meaning as commonly understood by one of ordinary skill in the art to which this invention belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the invention, such that others may, by applying current knowledge, change, vary, modify, and/or adapt these exemplary, non-limiting embodiments for various applications without departing from the spirit and scope of the invention and elements or methods similar or equivalent to those described herein can be used in practicing the present invention. Any and all such changes, variations, modifications, and/or adaptations should and are intended to be comprehended within the meaning and range of equivalents of the disclosed exemplary embodiments and may be substituted without departing from the true spirit and scope of the invention.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A detectable/traceable pipe system, comprising:
   a pipe body defining a hollow;
   a magnetically detectable element embedded or encased within the pipe body so as to provide a magnetically detectable property to the pipe body; and
   at least one connection fitting, wherein the connection fitting includes a continuous portion of a magnetically detectable element embedded or encased within the connection fitting so as to provide a magnetically detectable property to the connection fitting, wherein the continuous portion of a magnetically detectable element embedded or encased within the connection fitting overlaps at least a portion of the magnetically detectable element embedded or encased within the pipe body, such that the magnetically detectable element embedded or encased within the connection fitting is not electrically connected to the magnetically detectable element embedded or encased within the pipe body.

2. The detectable/traceable pipe system of claim 1, wherein the connection fitting comprises a T-fitting.

3. The detectable/traceable pipe system of claim 1, wherein the magnetically detectable element is embedded just below an outer surface of the pipe body.

4. The detectable/traceable pipe system of claim 1, wherein the magnetically detectable element is embedded towards an upper portion of the pipe body.

5. The detectable/traceable pipe system of claim 1, wherein the magnetically detectable element is embedded parallel to a longitudinal axis of the pipe body.

6. The detectable/traceable pipe system of claim 1, wherein the pipe body is constructed of polyvinyl chloride.

7. The detectable/traceable pipe system of claim 1, wherein the pipe body is constructed of a non-ferrous material.

8. The detectable/traceable pipe system of claim 1, wherein the magnetically detectable element is in the form of a wire.

9. The detectable/traceable pipe system of claim 1, wherein the magnetically detectable element comprises copper impregnated with a ferrous material.

10. The detectable/traceable pipe system of claim 1, wherein the magnetically detectable element comprises a ferrous material.

11. The detectable/traceable pipe system of claim 1, wherein the magnetically detectable element is co-extruded with the pipe body.

12. The detectable/traceable pipe system of claim 1, wherein the magnetically detectable element is deposited in a region of the pipe body.

13. The detectable/traceable pipe system of claim 1, wherein the magnetically detectable element is formed of a continuous portion of material.

14. The detectable/traceable pipe system of claim 1, wherein the magnetically detectable element is embedded along entire length of the pipe body.

15. The detectable/traceable pipe system of claim 1, wherein an exterior surface of the pipe body includes an indication stamp identifying an approximate location of the magnetically detectable element within the pipe body.

16. A detectable/traceable pipe system, comprising:
    an elongate portion of material extending from a first end to a second end and defining a pipe body having a hollow;
    a magnetically detectable element embedded or encased within the pipe body so as to provide a magnetically detectable property to the pipe body; and
    at least one connection fitting, wherein the connection fitting includes a continuous portion of a magnetically detectable element embedded or encased within the connection fitting so as to provide a magnetically detectable property to the connection fitting, wherein the continuous portion of a magnetically detectable element embedded or encased within the connection fitting overlaps at least a portion of the magnetically detectable element embedded or encased within the pipe body, such that the magnetically detectable element embedded or encased within the connection fitting is not electrically connected to the magnetically detectable element embedded or encased within the pipe body.

17. The detectable/traceable pipe system of claim 16, wherein the pipe body is constructed of a non-ferrous material.

18. The detectable/traceable pipe system of claim 16, wherein the magnetically detectable element is co-extruded with the pipe body.

19. A detectable/traceable pipe element, comprising:
    a first elongate portion of material extending from a first end to a second end and defining a first pipe body having a first hollow portion;
    a second elongate portion of material extending from the first pipe body, between the first end and the second end of the first pipe body, to a terminating end and defining a second pipe body having a second hollow portion, wherein the second pipe body has a longitudinal axis that is substantially perpendicular to a longitudinal axis of the first pipe body, and wherein the first hollow portion is in fluid communication with the second hollow portion;
    a first magnetically detectable element embedded or encased within the first pipe body; and
    a second magnetically detectable element embedded or encased within the second pipe body, wherein the first magnetically detectable element provides a magnetically detectable property to the first pipe body and the second magnetically detectable element provides a magnetically detectable property to the second pipe body.

20. The detectable/traceable pipe system of claim 19, wherein at least a portion of the second magnetically detectable element is embedded or encased within a portion of the first pipe body.

* * * * *